US012562840B2

(12) United States Patent   (10) Patent No.:   US 12,562,840 B2
Kanamarlapudi et al.   (45) Date of Patent:   Feb. 24, 2026

(54) TECHNIQUES FOR TRANSMISSION CONTROL PROTOCOL (TCP) PACKET LOSS RECOVERY

(71) Applicant: QUALCOMM Incorporated, San Diego, CA (US)

(72) Inventors: Sitaramanjaneyulu Kanamarlapudi, San Diego, CA (US); Harish Bhandiwad, San Diego, CA (US); Uma Srinivas Kadali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 683 days.

(21) Appl. No.: 17/647,421

(22) Filed: Jan. 7, 2022

(65) Prior Publication Data

US 2022/0231790 A1   Jul. 21, 2022

Related U.S. Application Data

(60) Provisional application No. 63/199,718, filed on Jan. 19, 2021.

(51) Int. Cl.
*H04L 1/08* (2006.01)
*H04W 24/08* (2009.01)
(52) U.S. Cl.
CPC ............... *H04L 1/08* (2013.01); *H04W 24/08* (2013.01)
(58) Field of Classification Search
CPC ..... H04L 1/08; H04L 1/1858; H04L 43/0829; H04W 24/08
See application file for complete search history.

(56) References Cited

U.S. PATENT DOCUMENTS

| | | | | |
|---|---|---|---|---|
| 10,805,836 | B2 | 10/2020 | Yu et al. | |
| 2006/0182025 | A1* | 8/2006 | Kim | H04L 47/193 |
| | | | | 370/465 |
| 2012/0176898 | A1 | 7/2012 | Ehsan et al. | |
| 2017/0135023 | A1* | 5/2017 | Jung | H04W 40/12 |
| 2017/0187593 | A1* | 6/2017 | Balasubramanian | |
| | | | | H04L 65/403 |
| 2021/0359787 | A1* | 11/2021 | Migault | H04L 1/1867 |
| 2022/0225163 | A1* | 7/2022 | Sharma | H04L 43/20 |
| 2023/0336277 | A1* | 10/2023 | Li | H04L 1/18 |

FOREIGN PATENT DOCUMENTS

| | | | | | |
|---|---|---|---|---|---|
| EP | 1868311 A1 | * | 12/2007 | .......... | H04L 1/1809 |
| WO | WO-2014160722 A1 | * | 10/2014 | .......... | H04L 1/1812 |
| WO | WO-2018138672 A1 | | 8/2018 | | |
| WO | WO-2018204828 | | 11/2018 | | |

OTHER PUBLICATIONS

International Search Report and Written Opinion—PCT/US2022/070109—ISA/EPO—Apr. 4, 2022.

* cited by examiner

*Primary Examiner* — Awet Haile
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may detect a transmission control protocol (TCP) packet loss based at least in part on a packet data convergence protocol (PDCP) payload of a packet. The UE may transmit a plurality of retransmission requests of the packet based at least in part on the detection of the TCP packet loss for the packet. Numerous other aspects are described.

26 Claims, 11 Drawing Sheets

810    Detect a transmission control protocol (TCP) packet loss based at least in part on a packet data convergence protocol (PDCP) payload of a packet 820    Transmit a plurality of retransmission requests of the packet based at least in part on the detection of the TCP packet loss for the packet

800

910 Detect a TCP packet loss based at least in part on a TCP sequence and without a PDCP loss 920 Transmit a plurality of retransmission requests of the packet based at least in part on the detection of the TCP packet loss for the packet

900

TECHNIQUES FOR TRANSMISSION CONTROL PROTOCOL (TCP) PACKET LOSS RECOVERY

CROSS-REFERENCE TO RELATED APPLICATION

This patent application claims priority to U.S. Provisional Patent Application No. 63/199,718, filed on Jan. 19, 2021, entitled "TECHNIQUES FOR TRANSMISSION CONTROL PROTOCOL (TCP) PACKET LOSS RECOVERY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmission control protocol (TCP) packet loss recovery.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the one or more processors configured to: detect a transmission control protocol (TCP) packet loss based at least in part on a packet data convergence protocol (PDCP) payload of a packet; and transmit a plurality of retransmission requests of the packet based at least in part on the detection of the TCP packet loss for the packet.

In some aspects, a method of wireless communication performed by a UE includes detecting a TCP packet loss based at least in part on a PDCP payload of a packet; and transmitting a plurality of retransmission requests of the packet based at least in part on the detection of the TCP packet loss for the packet.

In some aspects, a non-transitory computer-readable medium storing a set of instructions for wireless communication includes one or more instructions that, when executed by one or more processors of a UE, cause the UE to: detect a TCP packet loss based at least in part on a PDCP payload of a packet; and transmit a plurality of retransmission requests of the packet based at least in part on the detection of the TCP packet loss for the packet.

In some aspects, an apparatus for wireless communication includes means for detecting a TCP packet loss based at least in part on a PDCP payload of a packet; and means for transmitting a plurality of retransmission requests of the packet based at least in part on the detection of the TCP packet loss for the packet.

In some aspects, a UE for wireless communication includes a memory; and one or more processors coupled to the memory, the one or more processors configured to: detect a TCP packet loss based at least in part on a TCP sequence and without a PDCP loss; and transmit a plurality of retransmission requests of the packet based at least in part on the detection of the TCP packet loss for the packet.

In some aspects, a method of wireless communication performed by a UE includes detecting a TCP packet loss based at least in part on a TCP sequence and without a PDCP loss; and transmitting a plurality of retransmission requests of the packet based at least in part on the detection of the TCP packet loss for the packet.

In some aspects, a non-transitory computer-readable medium storing a set of instructions for wireless communication includes one or more instructions that, when executed by one or more processors of a UE, cause the UE to: detect a TCP packet loss based at least in part on a TCP sequence and without a PDCP loss; and transmit a plurality of retransmission requests of the packet based at least in part on the detection of the TCP packet loss for the packet.

In some aspects, an apparatus for wireless communication includes means for detecting a TCP packet loss based at least in part on a TCP sequence and without a PDCP loss; and means for transmitting a plurality of retransmission requests of the packet based at least in part on the detection of the TCP packet loss for the packet.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
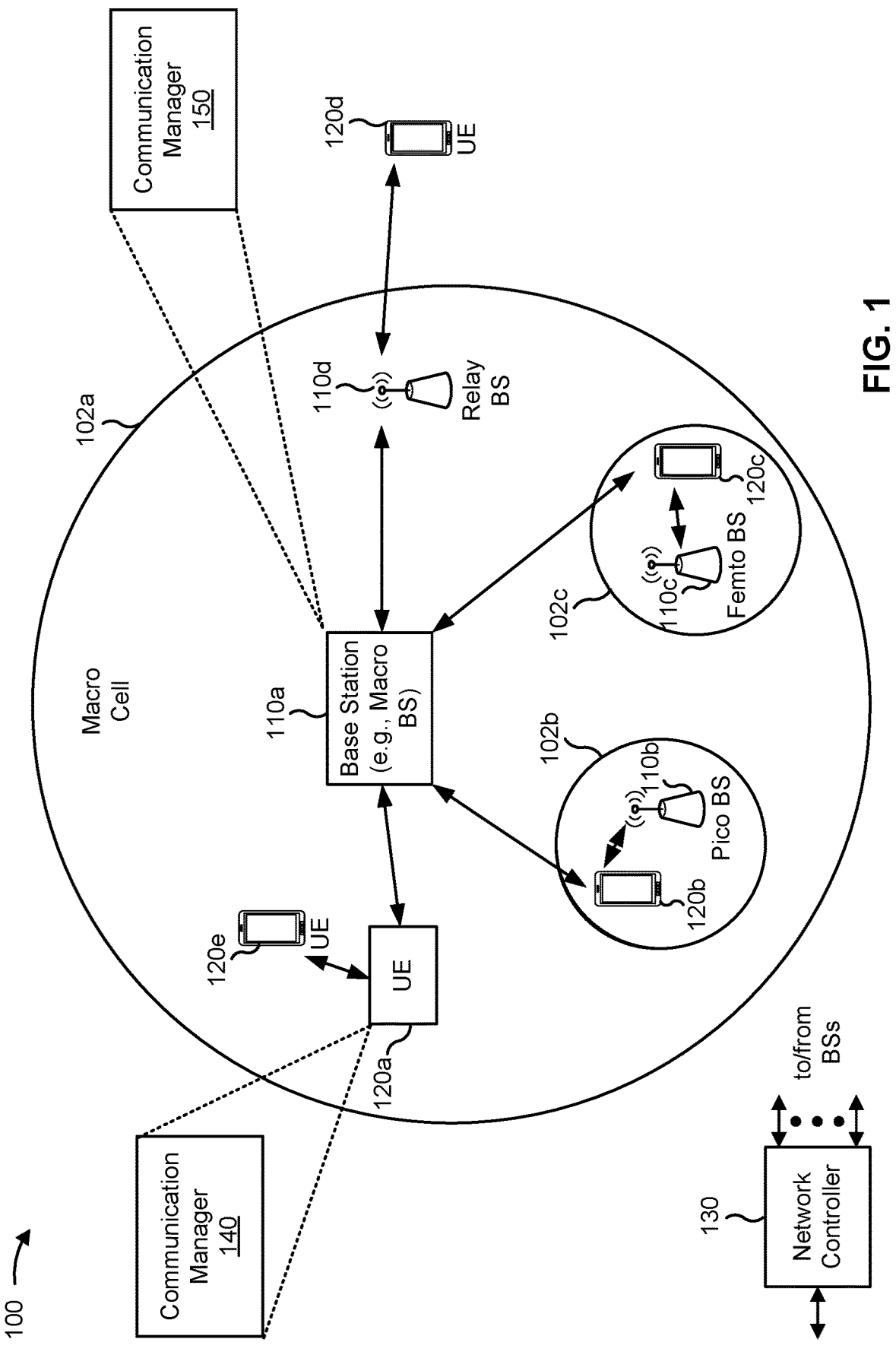
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect a transmission control protocol (TCP) packet loss based at least in part on a packet data convergence protocol (PDCP) payload of a packet; and transmit a plurality of retransmission requests of the packet based at least in part on the detection of the TCP packet loss for the packet. In some aspects, the communication manager 140 may detect a TCP packet loss based at least in part on a TCP sequence and without a PDCP loss; and transmit a plurality of retransmission requests of the packet based at least in part on the detection of the TCP packet loss for the packet. Additionally, or alternatively, the communication manager 140 may perform one or more other operations described herein. In some aspects, the base station 110 may include a communication manager 150. As described in more detail elsewhere herein, the communication manager 150 may receive retransmission requests from the UE 120 and may retransmit one or more lost packets based at least in part on receiving the retransmission requests. Additionally, or alternatively, the communication manager 150 may perform one or more other operations described herein.

As indicated above, FIG. 1 is provided as an example. Other examples may differ from what is described with regard to FIG. 1.

Figure 2:
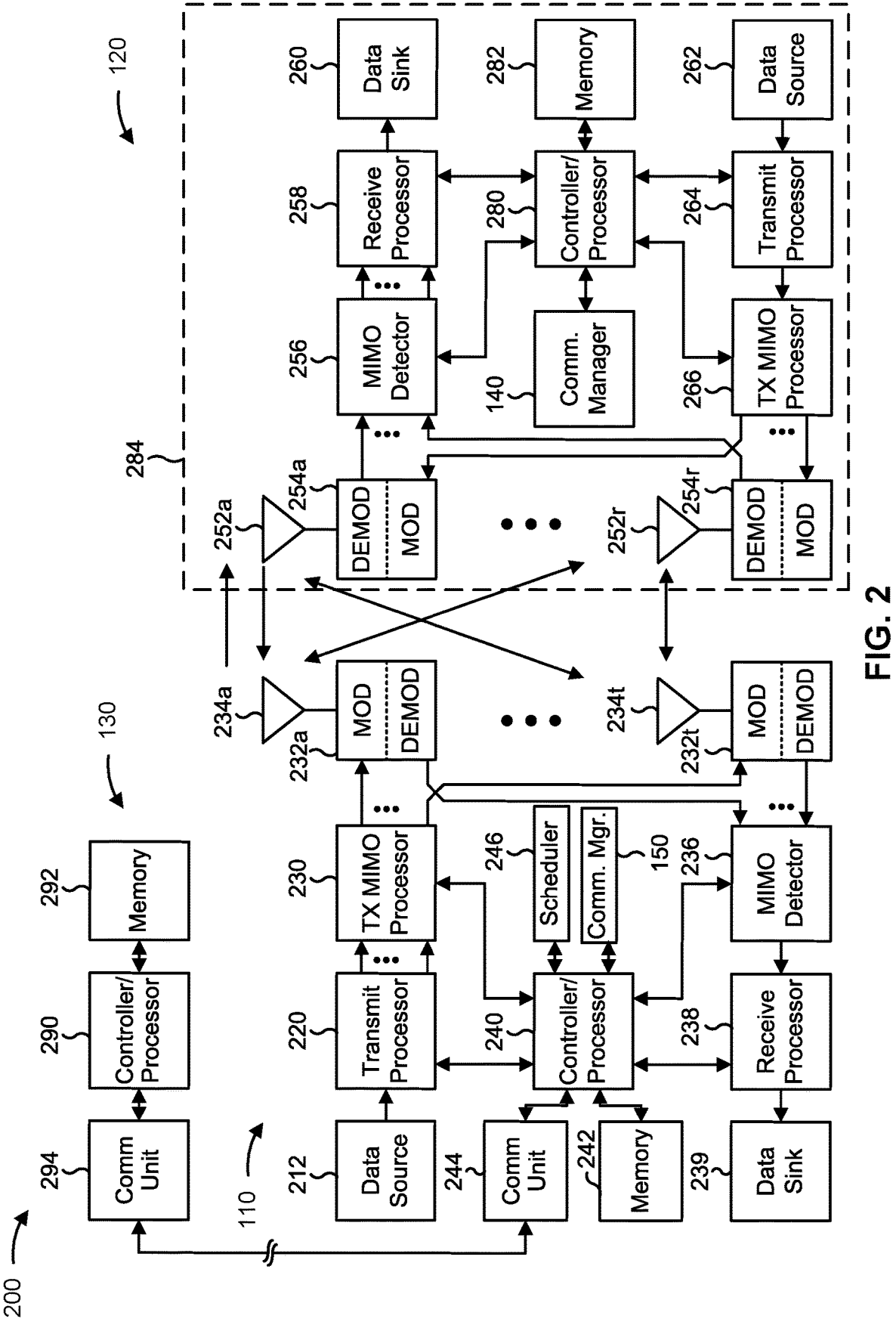
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with transmission control protocol (TCP) packet loss recovery, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE 120 includes means for detecting a TCP packet loss based at least in part on a packet data convergence protocol (PDCP) payload of a packet; and/or means for transmitting a plurality of retransmission requests of the packet based at least in part on the detection of the TCP packet loss for the packet. In some aspects, the UE 120 includes means for detecting a TCP packet loss based at least in part on a TCP sequence and without a PDCP loss; and means for transmitting a plurality of retransmission requests of the packet based at least in part on the detection of the TCP packet loss for the packet. In some aspects, the UE 120 includes means for transmitting a set of repetitions of a duplicate acknowledgement based at least in part on the detection of the TCP packet loss for the packet. In some aspects, the UE 120 includes means for detecting the TCP packet loss based at least in part on a size of the PDCP payload or a content of the PDCP payload. In some aspects, the UE 120 includes means for detecting the TCP packet loss based at least in part on an inspection of a header of the PDCP payload. In some aspects, the UE 120 includes means for detecting the TCP packet loss based at least in part on a packet being invalid. In some aspects, the UE 120 includes means for detecting the TCP packet loss based at least in part on a packet having a zero payload or a dummy payload. In some aspects, the UE 120 includes means for detecting the TCP packet loss based at least in part on an expiration of a PDCP timer of the UE 120. In some aspects, the UE 120 includes means for detecting a radio link control (RLC) level packet loss. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
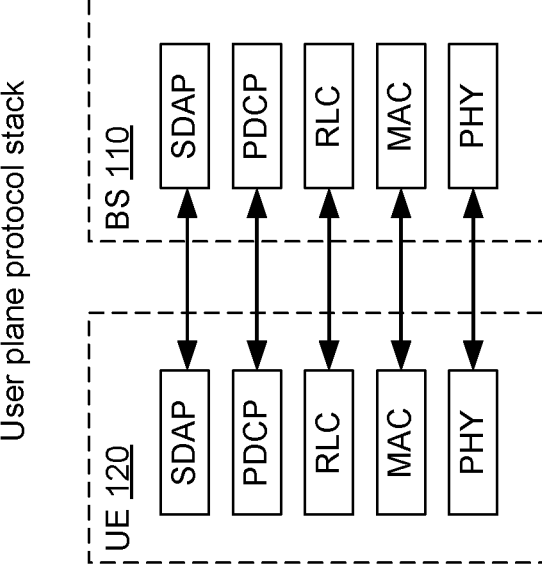
FIG. 3 is a diagram illustrating an example of a user plane protocol stack and a control plane protocol stack for a BS and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the base station 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the base station 110. On the control plane, the UE 120 and the base station 110 may include respective radio resource control (RRC) layers. Furthermore, the UE 120 may include a non-access stratum (NAS) layer in communication with an NAS layer of an access and management mobility function (AMF). The AMF may be associated with a core network associated with the base station 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the base station 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted, and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the base station 110 is receiving an uplink communication), the operations may be similar to those described for the transmitting side, but reversed. For example, the PHY layer may receive TBs, and may provide the TBs on one or more transport channels to the MAC layer. The MAC layer may map the transport channels to logical channels, and may provide data to the RLC layer via the logical channels. The RLC layer may map the logical channels to RLC channels, and may provide data to the PDCP layer via the RLC channels. The PDCP layer may map the RLC channels to radio bearers, and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU, and may pass the PDU to a lower layer. For example, the PDCP layer may encapsulate the PDCP SDU into a PDCP PDU, and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

Figure 4:
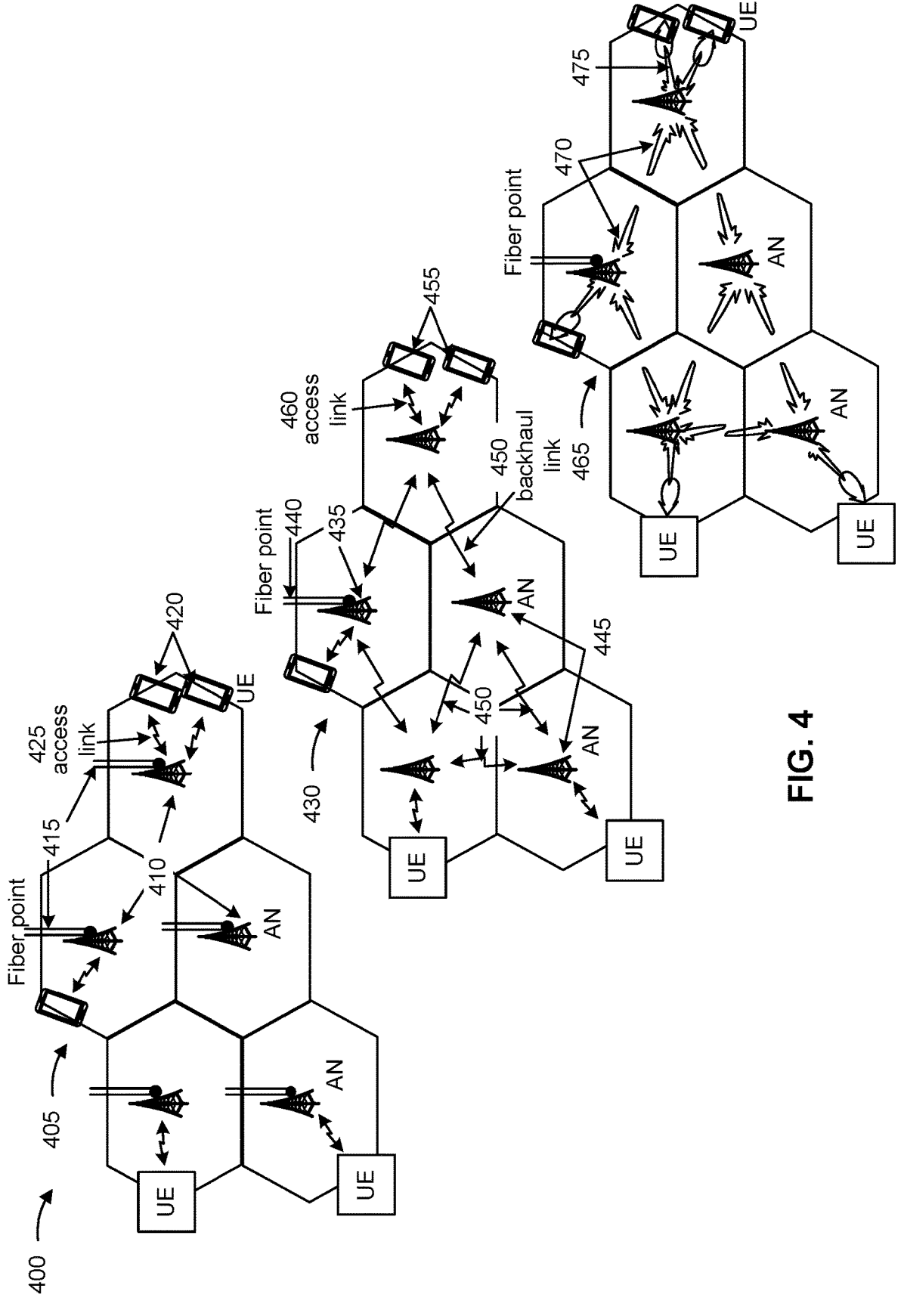
FIG. 4 is a diagram illustrating an example of radio access networks, in accordance with the present disclosure.

FIG. 4 is a diagram illustrating examples 400 of radio access networks, in accordance with the disclosure.

As shown by reference number 405, a traditional (e.g., 3G, 4G, or LTE) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may be a base station 110 shown in FIG. 1. In some aspects, a UE 420 shown in FIG. 4 may be a UE 120 shown in FIG. 1.

As shown by reference number 430, a radio access network may include a wireless backhaul network, sometimes referred to as an integrated access and backhaul (IAB) network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly or indirectly with the anchor base station 435 via one or more backhaul links 450 (e.g., via one or more non-anchor base stations 445) to form a backhaul path to the core network for carrying backhaul traffic. Backhaul link 450 may be a wireless link. Anchor base station(s) 435 and/or non anchor base station(s) 445 may communicate with one or more UEs 455 via access links 460, which may be wireless links for carrying access traffic. In some aspects, an anchor base station 435 and/or a non-anchor base station 445 shown in FIG. 4 may be a base station 110 shown in FIG. 1. In some aspects, a UE 455 shown in FIG. 4 may be a UE 120 shown in FIG. 1.

As shown by reference number 465, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 470 between base stations may use millimeter wave signals to carry information and/or may be directed toward a target base station using beamforming. Similarly, the wireless access links 475 between a UE and a base station may use millimeter wave signals and/or may be directed toward a target wireless node (e.g., a UE and/or a base station). In this way, inter-link interference may be reduced.

The configuration of base stations and UEs in FIG. 4 is shown as an example, and other examples are contemplated. For example, one or more base stations illustrated in FIG. 4 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 4 is provided as an example. Other examples may differ from what is described with regard to FIG. 4.

Figure 5:
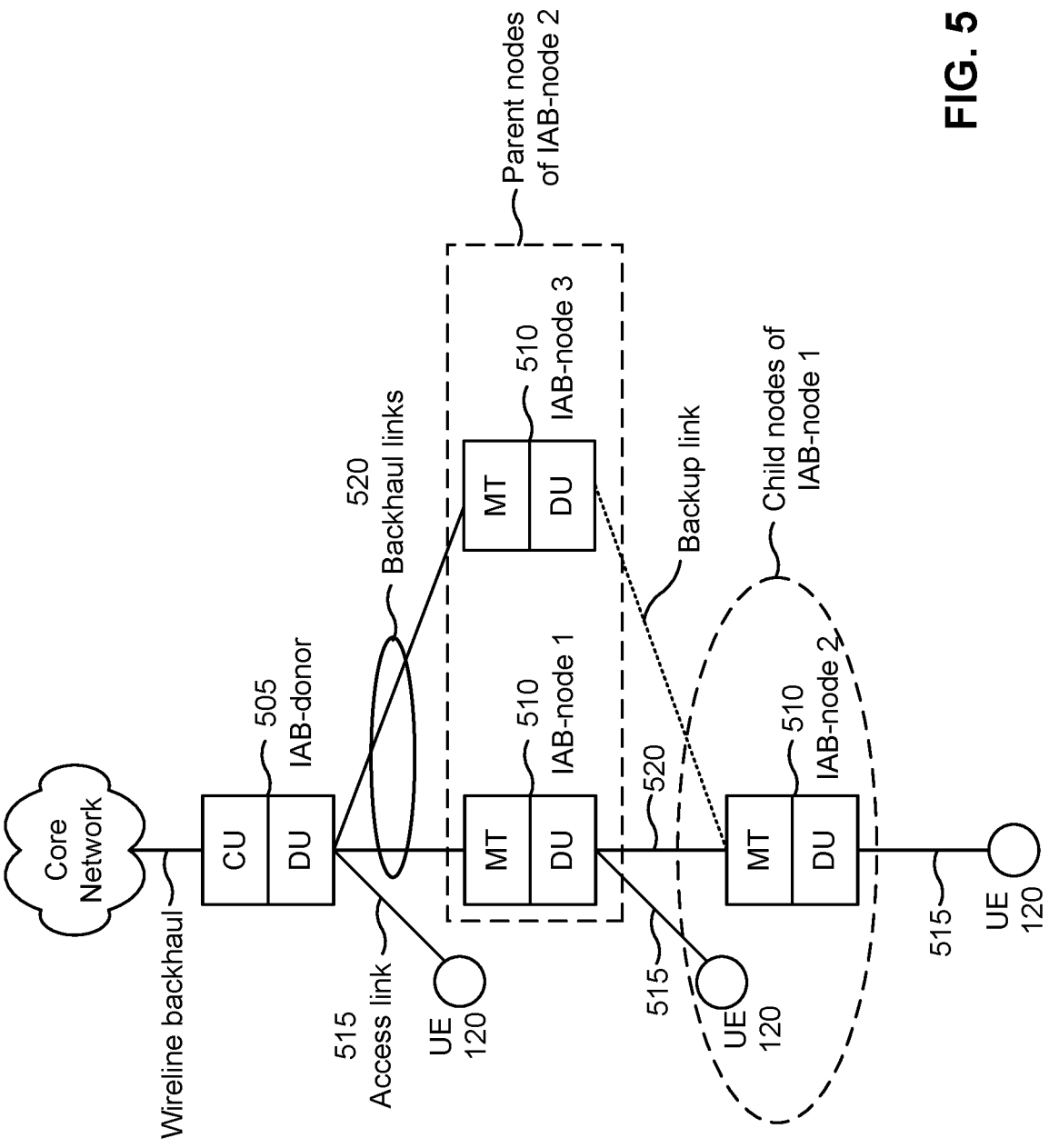
FIG. 5 is a diagram illustrating an example of an IAB network architecture, in accordance with the present disclosure.

FIG. 5 is a diagram illustrating an example 500 of an IAB network architecture, in accordance with the disclosure.

As shown in FIG. 5, an IAB network may include an IAB donor 505 (shown as IAB-donor) that connects to a core network via a wired connection (shown as a wireline backhaul). For example, an Ng interface of an IAB donor 505 may terminate at a core network. Additionally, or alternatively, an IAB donor 505 may connect to one or more devices of the core network that provide a core access and mobility management function (e.g., AMF). In some aspects, an IAB donor 505 may include a base station 110, such as an anchor base station, as described above in connection with 4. As shown, an IAB donor 505 may include a central unit (CU), which may perform access node controller (ANC) functions and/or AMF functions. The CU may configure a distributed unit (DU) of the IAB donor 505 and/or may configure one or more IAB nodes 510 (e.g., an MT and/or a DU of an IAB node 510) that connect to the core network via the IAB donor 505. Thus, a CU of an IAB donor 505 may control and/or configure the entire IAB network that connects to the core network via the IAB donor 505, such as by using control messages and/or configuration messages (e.g., a radio resource control (RRC) configuration message or an F1 application protocol (F1AP) message).

As further shown in FIG. 5, the IAB network may include IAB nodes 510 (shown as IAB-node 1, IAB-node 2, and IAB-node 3) that connect to the core network via the IAB donor 505. As shown, an IAB node 510 may include mobile termination (MT) functions (also sometimes referred to as UE functions (UEF)) and may include DU functions (also sometimes referred to as access node functions (ANF)). The MT functions of an IAB node 510 (e.g., a child node) may be controlled and/or scheduled by another IAB node 510 (e.g., a parent node of the child node) and/or by an IAB donor 505. The DU functions of an IAB node 510 (e.g., a parent node) may control and/or schedule other IAB nodes 510 (e.g., child nodes of the parent node) and/or UEs 120. Thus, a DU may be referred to as a scheduling node or a scheduling component, and an MT may be referred to as a scheduled node or a scheduled component. In some aspects, an IAB donor 505 may include DU functions and not MT functions. That is, an IAB donor 505 may configure, control, and/or schedule communications of IAB nodes 510 and/or UEs 120. A UE 120 may include only MT functions, and not DU functions. That is, communications of a UE 120 may be controlled and/or scheduled by an IAB donor 505 and/or an IAB node 510 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 505 or an IAB node 510, and a child node may be an IAB node 510 or a UE 120. Communications of an MT function of a child node may be controlled and/or scheduled by a parent node of the child node.

As further shown in FIG. 5, a link between a UE 120 (e.g., which only has MT functions, and not DU functions) and an IAB donor 505, or between a UE 120 and an IAB node 510, may be referred to as an access link 515. Access link 515 may be a wireless access link that provides a UE 120 with radio access to a core network via an IAB donor 505, and optionally via one or more IAB nodes 510. Thus, the network illustrated in 5 may be referred to as a multi-hop network or a wireless multi-hop network.

As further shown in FIG. 5, a link between an IAB donor 505 and an IAB node 510 or between two IAB nodes 510 may be referred to as a backhaul link 520. Backhaul link 520 may be a wireless backhaul link that provides an IAB node 510 with radio access to a core network via an IAB donor 505, and optionally via one or more other IAB nodes 510. In an IAB network, network resources for wireless communications (e.g., time resources, frequency resources, and/or spatial resources) may be shared between access links 515 and backhaul links 520. In some aspects, a backhaul link 520 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 505 or an IAB node 510.

As indicated above, FIG. 5 is provided as an example. Other examples may differ from what is described with regard to FIG. 5.

Figure 6:
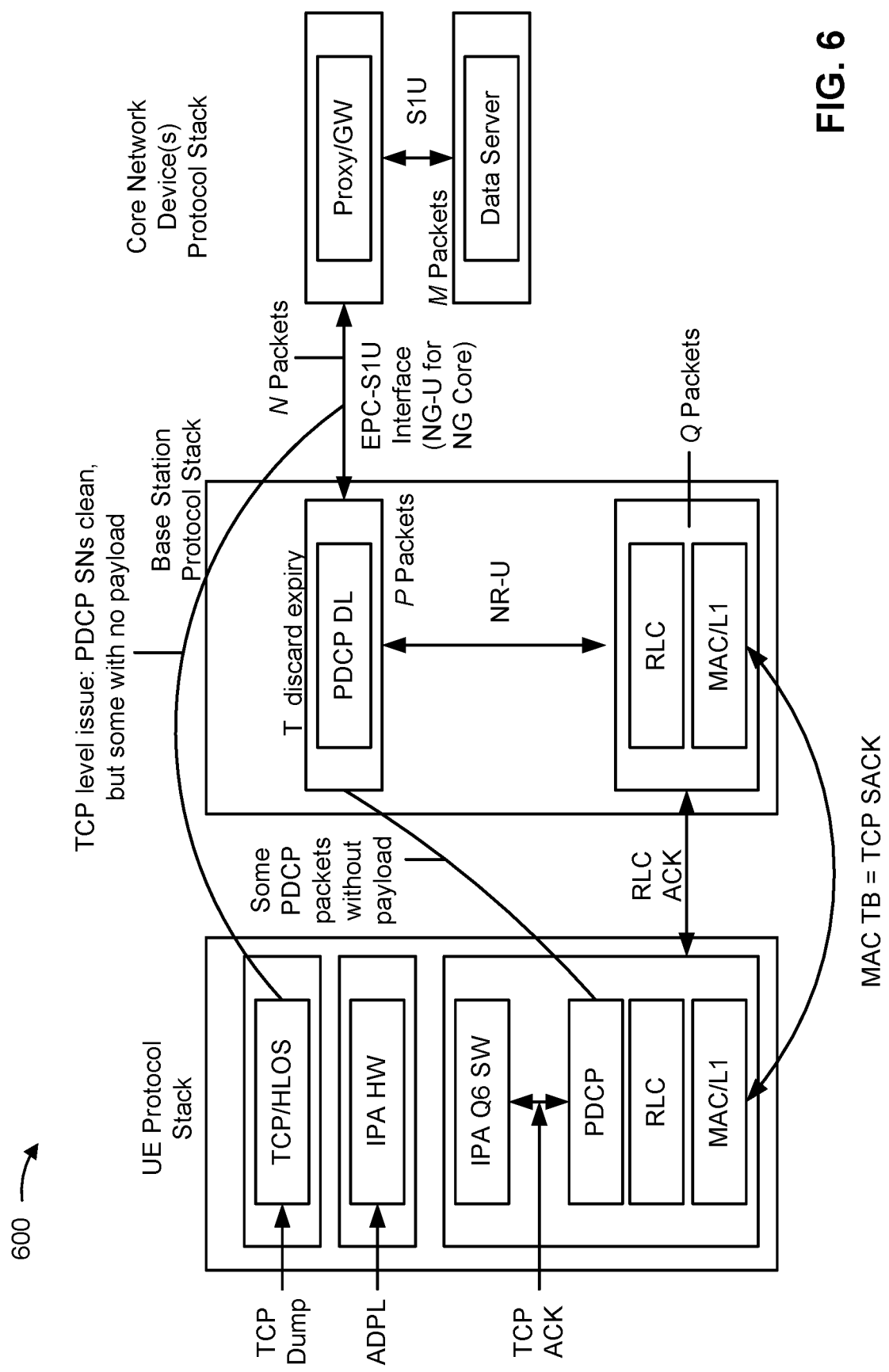
FIG. 6 is a diagram illustrating an example of a transmission control protocol (TCP) data flow resulting in packet loss, in accordance with the present disclosure.

FIG. 6 is a diagram illustrating an example 600 of a TCP data flow resulting in packet loss on a downlink as a result of a timer discard at a base station, in accordance with the disclosure. As shown in FIG. 6, different protocol layers are present in a UE (at left), a base station (at center), and one or more core network devices (at right).

As further shown in FIG. 6, a data server may provide a set of M packets via an S1U interface to a gateway (GW), which may direct the set of M packets as a set of N packets via an NG-U interface toward the base station and the UE. The base station may receive the packets at a packet data convergence protocol (PDCP) downlink (DL) entity of a CU and direct the packets as a set of P packets to a DU (and associated radio link control (RLC) and medium access control (MAC)/Layer 1 (L1) entities) of the base station via an NR-U interface. The base station may transmit data to the UE via an over-the-air (OTA) interface and the UE may pass transmitted packets up the protocol stack from a MAC/L1 entity, RLC entity, and PDCP entity of the UE towards a TCP entity/Higher Layer Operating System (HLOS) of the UE. Each of the aforementioned data transmissions may be associated with a buffer. For example, there may be a first buffer for the S1-U interface, a second buffer for the NG-U interface, a third buffer for the NR-U interface, or a fourth buffer for the OTA interface, among other examples.

Due to varying loading conditions on the OTA interface, some data, which is available in a buffer of the base station, is not transmitted within a configured time (e.g., before expiration of a timer associated with the data). This occurrence may be termed a timer discard (T_discard), as the occurrence may occur when a timer expires and packets, which were to convey the data, are discarded for failing to meet a latency requirement (e.g., of real-time transport protocol (RTP) or TCP). When the packets are lost at the base station and at an access stratum (AS) level, the UE may fail to receive an explicit notification of the packet loss. For example, the base station may transmit a set of PDCP packets with in-order PDCP sequence numbers (SNs) and RLC SNs to the UE. Because the PDCP packets are in-order ("clean") with regard to PDCP SNs and RLC SNs, no re-ordering occurs at the UE and the PDCP entity of the UE detects the packets as having been properly received. However, the PDCP packets may have empty payloads as a result of the PDCP entity of the base station discarding packets in the buffer of the base station. In other words, the UE receives a MAC service data unit (SDU) with 10 bytes, and the 10 bytes include 3 bytes of PDCP header, 3 bytes of RLC header, 2 bytes of MAC header (if the SDU is less than 255 Octets, otherwise 3 bytes of MAC header), and 2 bytes of dummy payload (e.g., filler bits) or zero payload (e.g., zero bits).

At the TCP entity of the UE, the UE may detect that packets have been lost and the UE may transmit, for each packet, a TCP duplicate (DUP) acknowledgement (ACK) to the base station. After a threshold quantity of DUP ACKs, retransmission of the discarded packets is triggered. For example, depending on configuration, retransmission may occur after a quantity in a range from 3 to 17 DUP ACKs. A spacing between transmission of DUP ACKs may be greater than a threshold, which may result in poor network performance for the UE.

As indicated above, FIG. 6 is provided as an example. Other examples may differ from what is described with regard to FIG. 6.

Some aspects described herein enable TCP packet loss recovery. For example, a UE may detect that a PDCP payload is a zero payload, an invalid payload, or a dummy payload, among other examples, and may determine that a TCP packet loss has occurred at a base station (e.g., the base station has discarded TCP packets at a buffer of a PDCP entity of the base station). In this case, the UE may repeat transmission of a DUP ACK to trigger a fast retransmission of lost packets. For example, rather than waiting for a threshold quantity of DUP ACKs to be generated based at least in part on a threshold quantity of detected packet losses, the UE may artificially generate multiple DUP ACKs for a single detected packet loss, thereby immediately triggering retransmission. In this way, the UE improves detection of packet loss and reduces an amount of time for retransmission of lost packets, thereby improving network performance for the UE.

Figure 7:
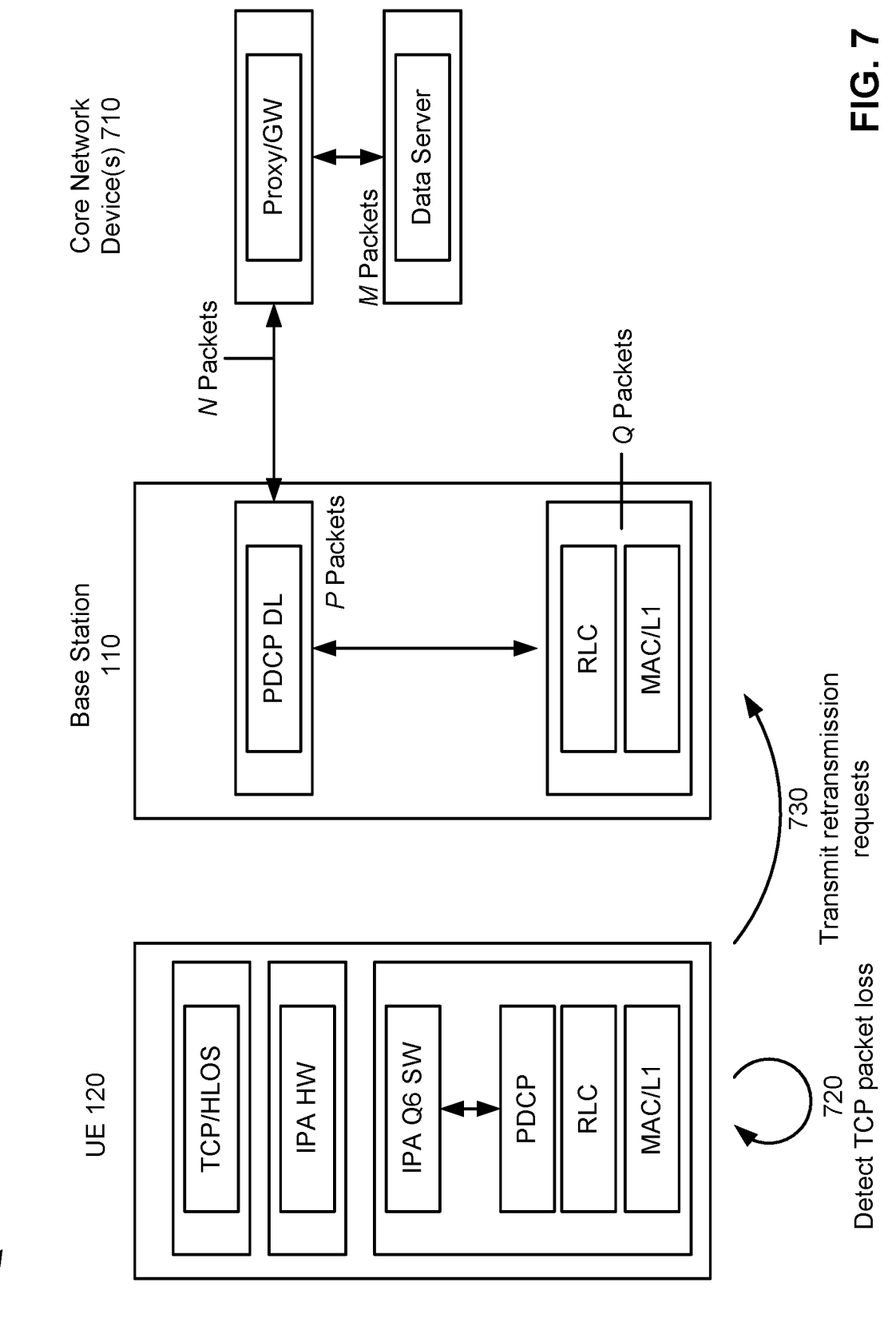
FIG. 7 is a diagram illustrating an example associated with TCP packet loss recovery, in accordance with the present disclosure.

FIG. 7 is a diagram illustrating an example 700 associated with TCP packet loss recovery, in accordance with the present disclosure. As shown in FIG. 7, example 700 includes communication between a base station 110, a UE 120, and one or more core network devices 710. In some aspects, the base station 110 and UE 120 may be included in a wireless network, such as wireless network 100. The base station 110 and UE 120 may communicate via a wireless access link, which may include an uplink and a downlink.

As shown in FIG. 7, and by reference number 720, UE 120 may detect a TCP packet loss. For example, UE 120 may detect a TCP packet loss based at least in part on a PDCP payload of a packet. In this case, UE 120 may detect the TCP packet loss based at least in part on detecting a PDCP loss, as described herein. Additionally, or alternatively, UE 120 may detect the TCP packet loss based at least in part on a TCP sequence. In this case, UE 120 may detect the TCP packet loss without a PDCP loss, as described herein.

In some aspects, UE 120 may detect the TCP packet loss by analyzing contents of a payload header. For example, after PDCP deciphering, UE 120 may parse a payload of a packet to determine where, up a protocol stack, to send the packet. In this case, UE 120 may use an IP packet processing entity (e.g., an IP Accelerator (IPA) entity), which may be a hardware component (IPA HW) or a software component (IPA SW), to parse the payload. Based at least in part on parsing the payload, UE 120 may determine that the packet includes a dummy payload or other invalid type of payload, which was added at a PDCP entity of base station 110. Additionally, or alternatively, the UE may detect another type of packet loss, such as an RLC packet loss. Additionally, or alternatively, the UE may detect a packet loss based at least in part on expiration of a PDCP timer at the UE. In some aspects, the UE may detect a packet loss without a PDCP loss occurring. For example, the UE may detect an out-of-order TCP sequence indicating a packet loss.

As further shown in FIG. 7, and by reference number 730, UE 120 may transmit retransmission requests. For example, based at least in part on detecting the TCP packet loss, UE 120 may transmit a retransmission request to trigger a retransmission of the packet (e.g., at a modem level of UE 120). In this case, UE 120 may transmit a set of back-to-back TCP DUP ACKs to trigger the retransmission of the packet faster than if UE 120 waited for retransmission to be triggered at a TCP entity of UE 120. In some aspects, UE 120 may generate and transmit a set of repetitions of a DUP ACK packet (e.g., a threshold quantity, K, of repetitions) at a modem, which is at a head of the PDCP entity in a protocol stack of UE 120. Additionally, or alternatively, UE 120 may generate and transmit the set of repetitions of the DUP ACK packet at an IPA HW or IPA SW entity of UE 120. In some aspects, UE 120 may generate and transmit the set of repetitions at a higher level operating system (HLOS) driver level of UE 120. Additionally, or alternatively, UE 120 may generate and transmit the set of repetitions at a TCP entity of UE 120 (but before other TCP retransmission criteria are satisfied, thereby reducing an amount of time to trigger retransmission). In this way, UE 120 reduces an amount of time for retransmission of data dropped at a PDCP entity of base station 110, thereby improving network and device performance.

As indicated above, FIG. 7 is provided as an example. Other examples may differ from what is described with respect to FIG. 7.

Figure 8:
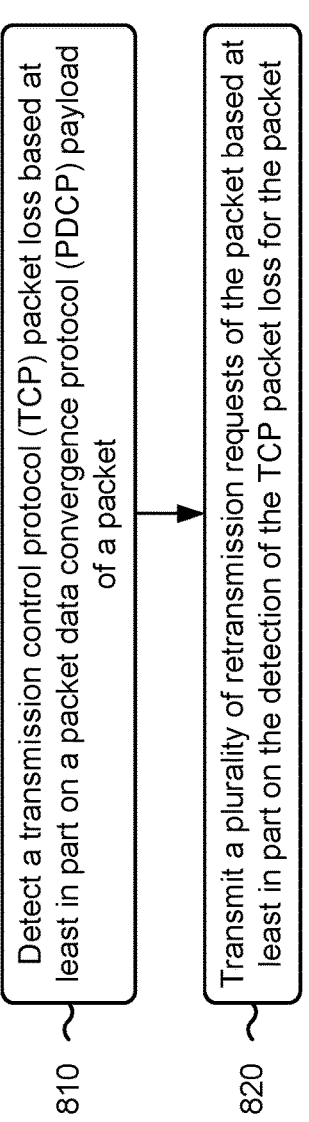
FIGS. 8-9 are diagrams illustrating example processes associated with TCP packet loss recovery, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for TCP packet loss recovery.

As shown in FIG. 8, in some aspects, process 800 may include detecting a TCP packet loss based at least in part on a PDCP payload of a packet (block 810). For example, the UE (e.g., using detection component 1008, depicted in FIG. 10) may detect a TCP packet loss based at least in part on a PDCP payload of a packet, as described above.

As further shown in FIG. 8, in some aspects, process 800 may include transmitting a plurality of retransmission requests of the packet based at least in part on the detection of the TCP packet loss for the packet (block 820). For example, the UE (e.g., using transmission component 1004, depicted in FIG. 10) may transmit a plurality of retransmission requests of the packet based at least in part on the detection of the TCP packet loss for the packet, as described above.

Process 800 may include additional aspects, such as any single aspect or any combination of aspects described below and/or in connection with one or more other processes described elsewhere herein.

In a first aspect, transmitting the plurality of retransmission requests comprises transmitting a set of repetitions of a duplicate acknowledgement based at least in part on the detection of the TCP packet loss for the packet.

In a second aspect, alone or in combination with the first aspect, the set of repetitions are transmitted by a modem associated with a PDCP entity of the UE.

In a third aspect, alone or in combination with one or more of the first and second aspects, the set of repetitions are transmitted by a hardware or software component of an IP packet processing entity.

In a fourth aspect, alone or in combination with one or more of the first through third aspects, the set of repetitions are transmitted by a high level operating system entity.

In a fifth aspect, alone or in combination with one or more of the first through fourth aspects, the set of repetitions are transmitted by a TCP entity.

In a sixth aspect, alone or in combination with one or more of the first through fifth aspects, detecting the TCP packet loss comprises detecting the TCP packet loss based at least in part on a size of the PDCP payload or a content of the PDCP payload.

In a seventh aspect, alone or in combination with one or more of the first through sixth aspects, the detection of the TCP packet loss comprises detecting the TCP packet loss based at least in part on an inspection of a header of the PDCP payload.

In an eighth aspect, alone or in combination with one or more of the first through seventh aspects, the inspection of the header of the PDCP payload is performed using a hardware or software component of an IP packet processing entity.

In a ninth aspect, alone or in combination with one or more of the first through eighth aspects, the detection of the TCP packet loss comprises detecting the TCP packet loss based at least in part on a packet being invalid.

In a tenth aspect, alone or in combination with one or more of the first through ninth aspects, the detection of the TCP packet loss comprises detecting the TCP packet loss based at least in part on a packet having a zero payload or a dummy payload.

In an eleventh aspect, alone or in combination with one or more of the first through tenth aspects, the detection of the TCP packet loss comprises detecting the TCP packet loss based at least in part on an expiration of a PDCP timer of the UE.

In a twelfth aspect, alone or in combination with one or more of the first through eleventh aspects, detection of the TCP packet loss comprises detecting an RLC level packet loss.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
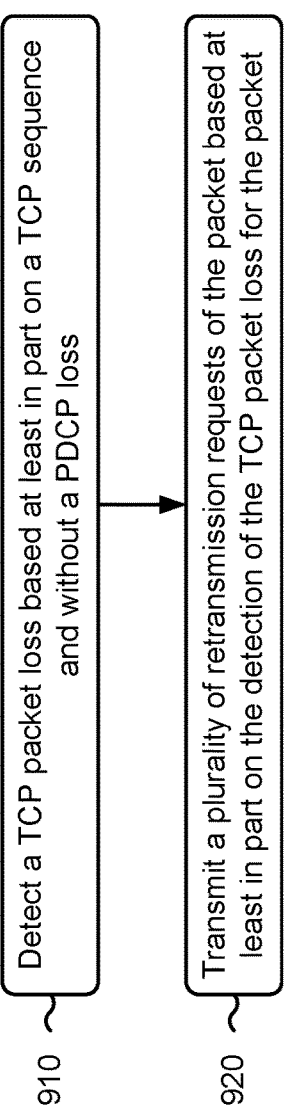

FIG. 9 is a diagram illustrating an example process 900 performed, for example, by a UE, in accordance with the present disclosure. Example process 900 is an example where the UE (e.g., UE 120) performs operations associated with TCP packet loss recovery.

As shown in FIG. 9, in some aspects, process 900 may include detecting a TCP packet loss based at least in part on a TCP sequence and without a PDCP loss (block 910). For example, the UE (e.g., using communication manager 140 and/or detection component 1008, depicted in FIG. 10) may detect a TCP packet loss based at least in part on a TCP sequence and without a PDCP loss, as described above.

As further shown in FIG. 9, in some aspects, process 900 may include transmitting a plurality of retransmission requests of the packet based at least in part on the detection of the TCP packet loss for the packet (block 920). For example, the UE (e.g., using communication manager 140 and/or transmission component 1004, depicted in FIG. 10) may transmit a plurality of retransmission requests of the packet based at least in part on the detection of the TCP packet loss for the packet, as described above.

Process 900 may include additional aspects, such as any single aspect or any combination of aspects described below and/or in connection with one or more other processes described elsewhere herein.

In a first aspect, process 900 includes transmitting a set of repetitions of a duplicate acknowledgement based at least in part on the detection of the TCP packet loss for the packet.

In a second aspect, alone or in combination with the first aspect, the set of repetitions are transmitted by a modem associated with a PDCP entity of the UE.

In a third aspect, alone or in combination with one or more of the first and second aspects, the set of repetitions are transmitted by a hardware or software component of an Internet Protocol (IP) packet processing entity.

In a fourth aspect, alone or in combination with one or more of the first through third aspects, the set of repetitions are transmitted by a high level operating system entity.

In a fifth aspect, alone or in combination with one or more of the first through fourth aspects, the set of repetitions are transmitted by a TCP entity.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
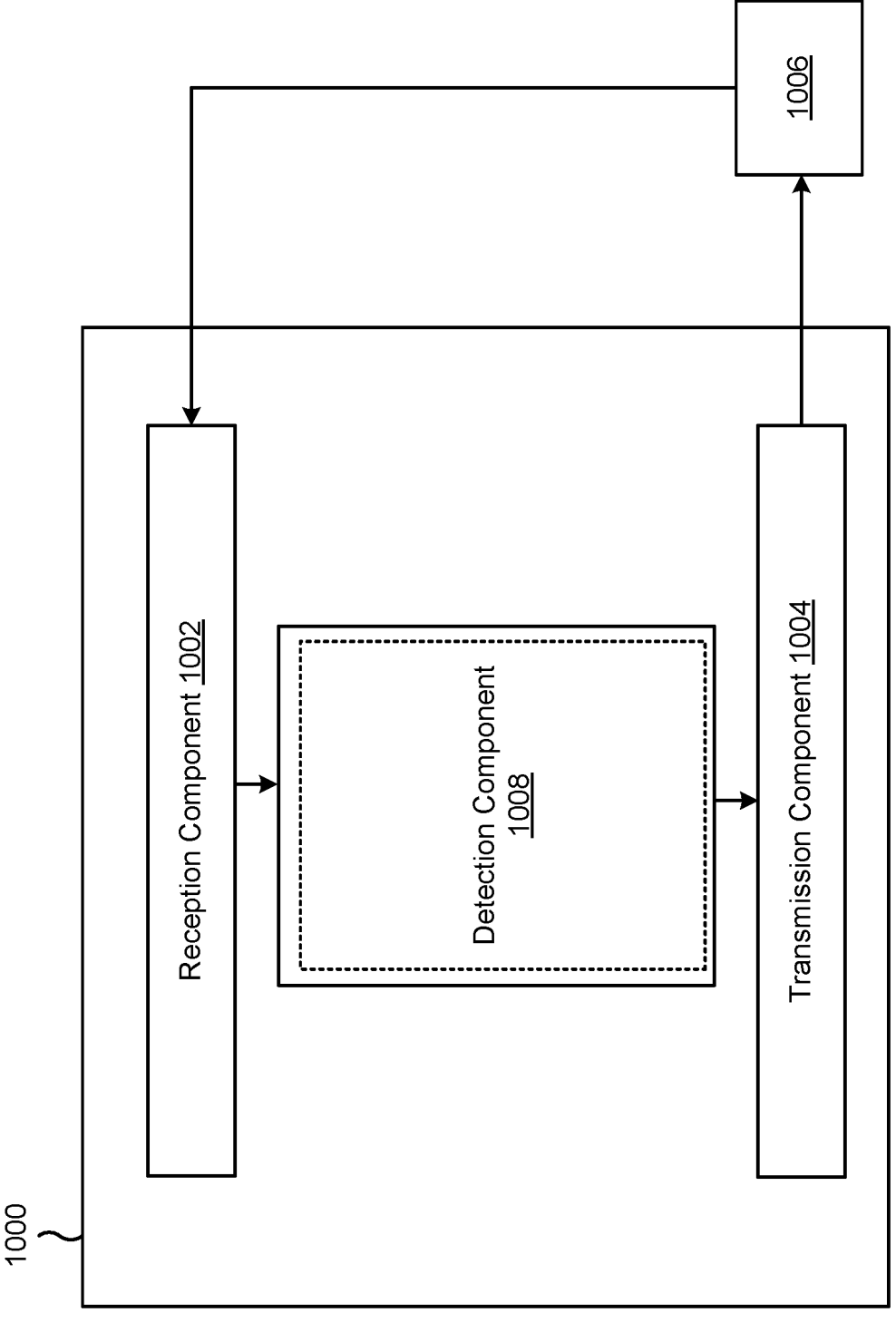
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a detection component 1008, among other examples.

In some aspects, the apparatus 1000 may be configured to perform one or more operations described herein. Additionally, or alternatively, the apparatus 1000 may be configured to perform one or more processes described herein, such as process 800 of FIG. 8 or process 900 of FIG. 9, among other examples. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The detection component 1008 may detect a TCP packet loss based at least in part on a PDCP payload of a packet. The transmission component 1004 may transmit a plurality of retransmission requests of the packet based at least in part on the detection of the TCP packet loss for the packet.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
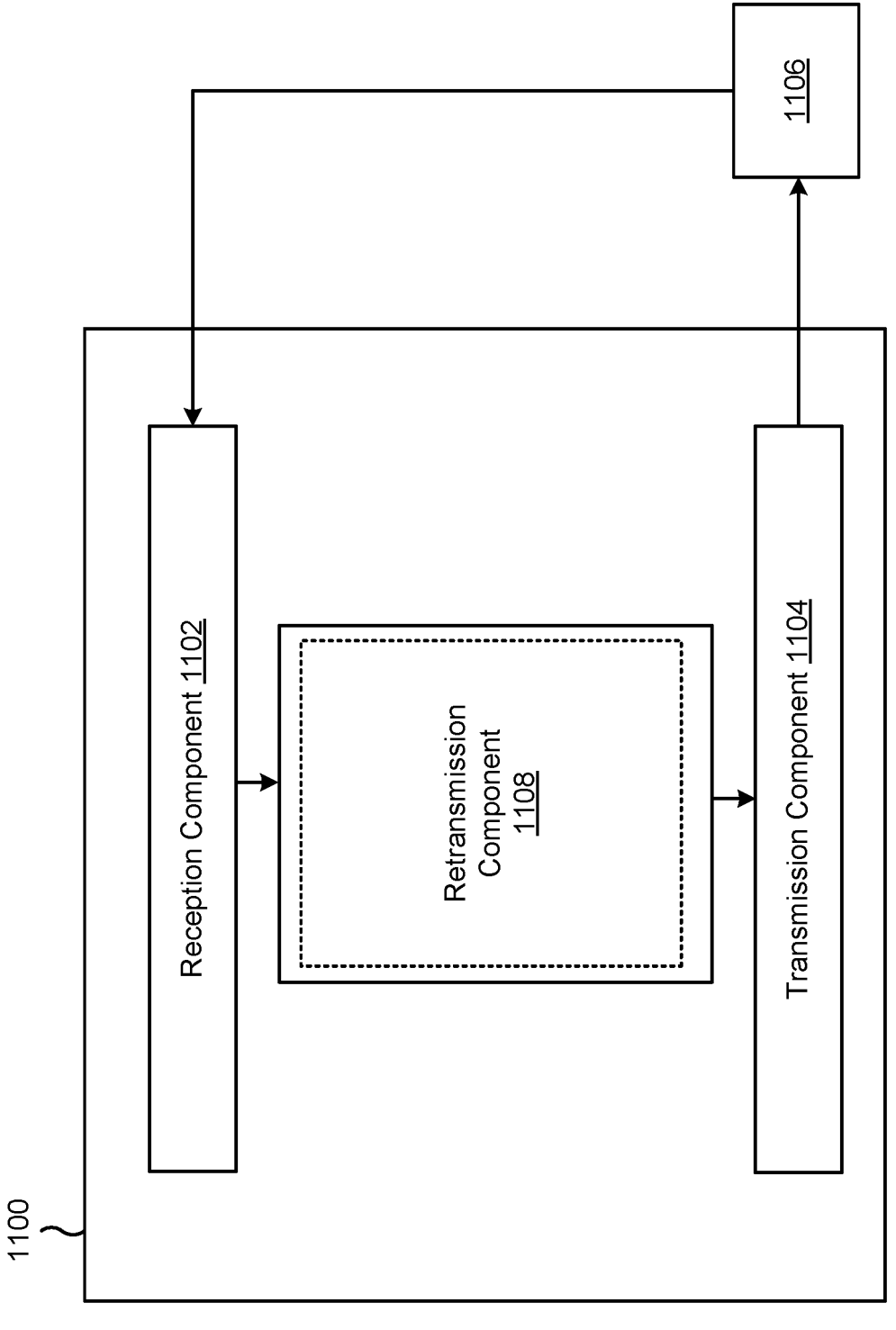

FIG. 11 is a block diagram of an example apparatus 1100 for wireless communication. The apparatus 1100 may be a BS, or a BS may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a retransmission component 1108, among other examples.

In some aspects, the apparatus 1100 may be configured to perform one or more operations described herein. Additionally, or alternatively, the apparatus 1100 may be configured to perform one or more processes described herein. In some aspects, the apparatus 1100 and/or one or more components shown in FIG. 11 may include one or more components of the BS described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the BS described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the BS described above in connection with FIG. 2. In some aspects, the transmission component 1104 may be co-located with the reception component 1102 in a transceiver.

The retransmission component 1108 may cause a retransmission of dropped data based at least in part on receiving a set of retransmission requests.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a user equipment (UE), comprising: detecting a transmission control protocol (TCP) packet loss based at least in part on a packet data convergence protocol (PDCP) payload of a packet; and transmitting a plurality of retransmission requests of the packet based at least in part on the detection of the TCP packet loss for the packet.

Aspect 2: The method of aspect 1, wherein transmitting the plurality of retransmission requests comprises: transmitting a set of repetitions of a duplicate acknowledgement based at least in part on the detection of the TCP packet loss for the packet.

Aspect 3: The method of aspect 2, wherein the set of repetitions are transmitted by a modem associated with a PDCP entity of the UE.

Aspect 4: The method of any of aspect 2 to 3, wherein the set of repetitions are transmitted by a hardware or software component of an Internet Protocol (IP) packet processing entity.

Aspect 5: The method of any of aspect 2 to 4, wherein the set of repetitions are transmitted by a high level operating system entity.

Aspect 6: The method of any of aspect 2 to 5, wherein the set of repetitions are transmitted by a TCP entity.

Aspect 7: The method of any of aspect 1 to 6, wherein detecting the TCP packet loss comprises: detecting the TCP packet loss based at least in part on a size of the PDCP payload or a content of the PDCP payload.

Aspect 8: The method of any of aspect 1 to 7, wherein the detection of the TCP packet loss comprises: detecting the TCP packet loss based at least in part on an inspection of a header of the PDCP payload.

Aspect 9: The method of aspect 8, wherein the inspection of the header of the PDCP payload is performed using a hardware or software component of an Internet Protocol (IP) packet processing entity.

Aspect 10: The method of any of aspect 1 to 9, wherein the detection of the TCP packet loss comprises: detecting the TCP packet loss based at least in part on a packet being invalid.

Aspect 11: The method of any of aspect 1 to 10, wherein the detection of the TCP packet loss comprises: detecting the TCP packet loss based at least in part on a packet having a zero payload or a dummy payload.

Aspect 12: The method of any of aspect 1 to 11, wherein the detection of the TCP packet loss comprises: detecting the TCP packet loss based at least in part on an expiration of a PDCP timer of the UE.

Aspect 13: The method of any of aspect 1 to 12, wherein detection of the TCP packet loss comprises: detecting a radio link control (RLC) level packet loss.

Aspect 14: A method of wireless communication performed by a user equipment (UE), comprising: detecting a transmission control protocol (TCP) packet loss based at least in part on a TCP sequence and without a packet data convergence protocol (PDCP) loss; and transmitting a plurality of retransmission requests of the packet based at least in part on the detection of the TCP packet loss for the packet.

Aspect 15: The method of aspect 14, wherein transmitting the plurality of retransmission requests comprises: transmitting a set of repetitions of a duplicate acknowledgement based at least in part on the detection of the TCP packet loss for the packet.

Aspect 16: The method of aspect 15, wherein the set of repetitions are transmitted by a modem associated with a PDCP entity of the UE.

Aspect 17: The method of any of aspect 15 to 16, wherein the set of repetitions are transmitted by a hardware or software component of an Internet Protocol (IP) packet processing entity.

Aspect 18: The method of any of aspect 15 to 17, wherein the set of repetitions are transmitted by a high level operating system entity.

Aspect 19: The method of any of aspect 15 to 18, wherein the set of repetitions are transmitted by a TCP entity.

Aspect 20: The method of any of aspect 14 to 19, wherein detecting the TCP packet loss comprises: detecting the TCP packet loss based at least in part on a size of the PDCP payload or a content of the PDCP payload.

Aspect 21: The method of any of aspect 14 to 20, wherein the detection of the TCP packet loss comprises: detecting the TCP packet loss based at least in part on an inspection of a header of the PDCP payload.

Aspect 22: The method of aspect 21, wherein the inspection of the header of the PDCP payload is performed using a hardware or software component of an Internet Protocol (IP) packet processing entity.

Aspect 23: The method of any of aspect 14 to 22, wherein the detection of the TCP packet loss comprises: detecting the TCP packet loss based at least in part on a packet being invalid.

Aspect 24: The method of any of aspect 14 to 23, wherein the detection of the TCP packet loss comprises: detecting the TCP packet loss based at least in part on a packet having a zero payload or a dummy payload.

Aspect 25: The method of any of aspect 14 to 24, wherein the detection of the TCP packet loss comprises: detecting the TCP packet loss based at least in part on an expiration of a PDCP timer of the UE.

Aspect 26: The method of any of aspect 14 to 25, wherein detection of the TCP packet loss comprises: detecting a radio link control (RLC) level packet loss.

Aspect 27: An apparatus for wireless communication at a device, comprising a processor; memory coupled with the processor; and instructions stored in the memory and executable by the processor to cause the apparatus to perform the method of one or more aspects of aspects 1-13.

Aspect 28: A device for wireless communication, comprising a memory and one or more processors coupled to the memory, the one or more processors configured to perform the method of one or more aspects of aspects 1-13.

Aspect 29: An apparatus for wireless communication, comprising at least one means for performing the method of one or more aspects of aspects 1-13.

Aspect 30: A non-transitory computer-readable medium storing code for wireless communication, the code comprising instructions executable by a processor to perform the method of one or more aspects of aspects 1-13.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 32: An apparatus for wireless communication at a device, comprising a processor; memory coupled with the processor; and instructions stored in the memory and executable by the processor to cause the apparatus to perform the method of one or more aspects of aspects 14-26.

Aspect 33: A device for wireless communication, comprising a memory and one or more processors coupled to the memory, the one or more processors configured to perform the method of one or more aspects of aspects 14-26.

Aspect 34: An apparatus for wireless communication, comprising at least one means for performing the method of one or more aspects of aspects 14-26.

Aspect 35: A non-transitory computer-readable medium storing code for wireless communication, the code comprising instructions executable by a processor to perform the method of one or more aspects of aspects 14-26.

Aspect 36: A non-transitory computer-readable medium storing a set of instructions for wireless communication, the set of instructions comprising one or more instructions that, when executed by one or more processors of a device, cause the device to perform the method of one or more aspects of aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
      detect a transmission control protocol (TCP) packet loss based at least in part on a packet data convergence protocol (PDCP) payload of a packet; and
      transmit a plurality of repeated retransmission requests of the packet based at least in part on the detection of the TCP packet loss for the packet, wherein the plurality of repeated retransmission requests correspond to a threshold quantity of retransmission requests, and wherein the plurality of repeated retransmission requests comprises a set of repetitions of a duplicate acknowledgement.

2. The UE of claim 1, wherein the set of repetitions are transmitted by a modem associated with a PDCP entity of the UE.

3. The UE of claim 1, wherein the set of repetitions are transmitted by a hardware or software component of an Internet Protocol (IP) packet processing entity.

4. The UE of claim 1, wherein the set of repetitions are transmitted by a high level operating system entity.

5. The UE of claim 1, wherein the set of repetitions are transmitted by a TCP entity.

6. The UE of claim 1, wherein the one or more processors, to detect the TCP packet loss, are configured to:
   detect the TCP packet loss based at least in part on a size of the PDCP payload or a content of the PDCP payload.

7. The UE of claim 1, wherein the detection of the TCP packet loss comprises:
   detect the TCP packet loss based at least in part on an inspection of a header of the PDCP payload.

8. The UE of claim 7, wherein the inspection of the header of the PDCP payload is performed using a hardware or software component of an Internet Protocol (IP) packet processing entity.

9. The UE of claim 1, wherein the detection of the TCP packet loss comprises:
   detect the TCP packet loss based at least in part on a packet being invalid.

10. The UE of claim 1, wherein the detection of the TCP packet loss comprises:
   detect the TCP packet loss based at least in part on a packet having a zero payload or a dummy payload.

11. The UE of claim 1, wherein the detection of the TCP packet loss comprises:
   detect the TCP packet loss based at least in part on an expiration of a PDCP timer of the UE.

12. The UE of claim 1, wherein detection of the TCP packet loss comprises:
   detect a radio link control (RLC) level packet loss.

13. A user equipment (UE) for wireless communication, comprising:
   one or more memories; and
   one or more processors coupled to the one or more memories, the one or more processors configured to:
      detect a transmission control protocol (TCP) packet loss based at least in part on a TCP sequence and without a packet data convergence protocol (PDCP) loss; and
      transmit a plurality of repeated retransmission requests of the packet based at least in part on the detection of the TCP packet loss for the packet, wherein the plurality of repeated retransmission requests correspond to a threshold quantity of retransmission requests, and wherein the plurality of repeated retransmission requests comprises a set of repetitions of a duplicate acknowledgement.

14. The UE of claim 13, wherein the set of repetitions are transmitted by a modem associated with a PDCP entity of the UE.

15. The UE of claim 13, wherein the set of repetitions are transmitted by a hardware or software component of an Internet Protocol (IP) packet processing entity.

16. The UE of claim 13, wherein the set of repetitions are transmitted by a high level operating system entity.

17. The UE of claim 13, wherein the set of repetitions are transmitted by a TCP entity.

18. A method of wireless communication performed by a user equipment (UE), comprising:
   detecting a transmission control protocol (TCP) packet loss based at least in part on a packet data convergence protocol (PDCP) payload of a packet; and
   transmitting a plurality of repeated retransmission requests of the packet based at least in part on the detection of the TCP packet loss for the packet, wherein the plurality of repeated retransmission requests correspond to a threshold quantity of retransmission requests, and wherein the plurality of repeated retransmission requests comprises a set of repetitions of a duplicate acknowledgement.

19. The method of claim 18, wherein the set of repetitions are transmitted by a modem associated with a PDCP entity of the UE.

20. The method of claim 18, wherein the set of repetitions are transmitted by a hardware or software component of an Internet Protocol (IP) packet processing entity.

21. The method of claim 18, wherein the set of repetitions are transmitted by a high level operating system entity.

22. The method of claim 18, wherein the set of repetitions are transmitted by a TCP entity.

23. The method of claim 18, wherein the detection of the TCP packet loss comprises:
   detecting the TCP packet loss based at least in part on a size of the PDCP payload or a content of the PDCP payload.

24. The method of claim 18, wherein the detection of the TCP packet loss comprises:
   detecting the TCP packet loss based at least in part on an inspection of a header of the PDCP payload.

25. The method of claim 24, wherein the inspection of the header of the PDCP payload is performed using a hardware or software component of an Internet Protocol (IP) packet processing entity.

26. A method of wireless communication performed by a user equipment (UE), comprising:

detecting a transmission control protocol (TCP) packet loss based at least in part on a TCP sequence and without a packet data convergence protocol (PDCP) loss; and transmitting a plurality of repeated retransmission requests of the packet based at least in part on the detection of the TCP packet loss for the packet, wherein the plurality repeated retransmission requests correspond to a threshold quantity of retransmission requests, and wherein the plurality of repeated retransmission requests comprises a set of repetitions of a duplicate acknowledgement.

* * * * *